(12) United States Patent
Noerenberg et al.

(10) Patent No.: US 11,609,000 B2
(45) Date of Patent: Mar. 21, 2023

(54) AIR-CONDITIONING METHOD AND DEVICE

(71) Applicant: BASF SE, Ludwigshafen am Rhein (DE)

(72) Inventors: Ralf Noerenberg, Ludwigshafen (DE); Walter Opper, Ludwigshafen (DE); Lukasz Karwacki, Ludwigshafen (DE); Mathias Weickert, Ludwigshafen (DE); Ulrich Mueller, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 231 days.

(21) Appl. No.: 16/618,767

(22) PCT Filed: May 30, 2018

(86) PCT No.: PCT/EP2018/064209
§ 371 (c)(1),
(2) Date: Dec. 2, 2019

(87) PCT Pub. No.: WO2018/220027
PCT Pub. Date: Dec. 6, 2018

(65) Prior Publication Data
US 2021/0080131 A1 Mar. 18, 2021

(30) Foreign Application Priority Data
Jun. 2, 2017 (EP) ..................................... 17174210

(51) Int. Cl.
*F24F 5/00* (2006.01)
*F24F 3/14* (2006.01)
*F24F 12/00* (2006.01)

(52) U.S. Cl.
CPC .......... *F24F 5/0014* (2013.01); *F24F 3/1429* (2013.01); *F24F 12/006* (2013.01); *F24F 2203/028* (2013.01)

(58) Field of Classification Search
CPC ...... F24F 5/0014; F24F 3/1429; F24F 12/006; F24F 2203/028; B01D 2253/204; B01D 53/261; F28F 13/18
(Continued)

(56) References Cited

U.S. PATENT DOCUMENTS 4,460,388 A * 7/1984 Fukami .................. F24F 13/30
165/166
5,170,633 A 12/1992 Kaplan
(Continued)

FOREIGN PATENT DOCUMENTS

CN 102032706 A 4/2011
CN 103574790 A 2/2014
(Continued)

OTHER PUBLICATIONS

Kubota, et. al., Dehumidification behavior of cross-flow heat exchanger type adsorber coated with aluminophosphate zeolite for desiccant humidity control system, Applied Thermal Engineering, vol. 122, 2017, pp. 618-625, Available online May 11, 2017. (Year: 2017).*
(Continued)

*Primary Examiner* — Steve S Tanenbaum
(74) *Attorney, Agent, or Firm* — Armstrong Teasdale LLP (57) ABSTRACT

The invention relates to an air conditioning apparatus including a first absorptive heat exchanger having sorption channels in at least one flow direction, a method for conditioning fluids, in particular for cooling and/or drying a stream of air, an adsorptive air-air cross-flow heat exchanger, and an outer wall element including an integrated air conditioning apparatus.

18 Claims, 5 Drawing Sheets

(58) Field of Classification Search
USPC .......................................................... 62/101
See application file for complete search history.

(56) References Cited

U.S. PATENT DOCUMENTS

| | | | |
|---|---|---|---|
| 6,199,392 | B1 | 3/2001 | Maeda |
| 7,082,781 | B2 | 8/2006 | Kikuchi et al. |
| 9,188,359 | B2 | 11/2015 | Ishimoto |
| 2006/0048538 | A1* | 3/2006 | Loffler ............... F24F 5/0014 62/480 |
| 2012/0043064 | A1* | 2/2012 | Takada ............... F28F 3/025 165/166 |
| 2013/0192281 | A1* | 8/2013 | Nam ................... F28D 17/00 62/476 |
| 2016/0084541 | A1* | 3/2016 | Aguado ............. F25B 17/083 62/111 |

FOREIGN PATENT DOCUMENTS

| | | |
|---|---|---|
| CN | 106610064 A | 5/2017 |
| CN | 206037293 U | 5/2017 |
| DE | 4220715 A1 | 1/1993 |
| DE | 102009050050 A1 | 4/2011 |
| EP | 1408286 A1 | 4/2004 |
| EP | 2230288 A2 | 9/2010 |
| EP | 2345853 A2 | 7/2011 |
| EP | 2385318 A1 | 11/2011 |
| EP | 2400231 A2 | 12/2011 |
| EP | 2675856 A1 | 12/2013 |
| KR | 101441486 B1 | 9/2014 |
| UA | 69450 U | 9/2004 |
| WO | 99/36733 A1 | 7/1999 |
| WO | 2017085049 A1 | 5/2017 |

OTHER PUBLICATIONS

English translation of the International Search Report for International Application No. PCT/EP2018/064209, dated Oct. 17, 2018, 3 pages.

Kubota, et al., "Dehumidification behavior of cross-flow heat exchanger type adsorber coated with aluminophosphate zeolite for desiccant humidity control system", Applied Thermal Engineering, vol. 122, Jul. 25, 2017, pp. 618-625.

Tu, et al., "Moisture uptake dynamics on desiccant-coated, water-sorbing heat exchanger", International Journal of Thermal Sciences, vol. 126, Apr. 2018, pp. 13-22.

* cited by examiner

AIR-CONDITIONING METHOD AND DEVICE

CROSS-REFERENCE TO RELATED APPLICATIONS

This application is a U.S. National Phase Application of PCT/EP2018/064209, filed May 30, 2018, which claims the benefit of priority to EP Application No. 17174210.9, filed Jun. 2, 2017, the contents of which are hereby expressly incorporated by reference in their entirety.

The invention relates to a method for conditioning fluids, in particular for cooling and/or drying a stream of air, an air conditioning apparatus, an adsorptive air-air cross-flow heat exchanger and an outer wall element comprising an integrated air conditioning apparatus.

Air conditioning plants are essential constituents of modern-day building technology. Together with shading and glass technology, they produce, independently of the exterior conditions, a healthy working environment in the interior which has an average relative atmospheric humidity and moderate temperatures in the range from 20 to 26° C. The energy consumption for operating existing buildings has now risen to about 40% of the total energy consumption of humanity, which is due, apart from other rea-sons such as poor insulation of heated buildings, largely to the air conditioning plants. As a result of increasing urbanization in humid and tropical climatic regions and the associated construction of high-rise buildings which require air conditioning plants for operation, the necessity of developing energy-efficient air conditioning plants is increasing. In these climatic regions in particular, drying of the air has the greatest energy consumption because the air is overcooled by means of the compressor technology which predominates at present until the required absolute atmospheric humidity is attained. This compressor technology customarily uses halogenated, preferably partially fluorinated, hydrocarbons as refrigerant, and these are coming under pressure because of their climate damage potential. Alternative refrigerants such as carbon dioxide are no better in this respect. The necessity of maintaining compressors, e.g. to ensure free running of movable parts or rebalancing of parts which are out of balance, introduction of further operating media and consumables, has led to a preference for a central insulation and has up to now prevented the development of decentralized air conditioning plants which are integrated into the building and allow an effectively personalized environment. On the other hand, split apparatuses for retrofitting have become established on the market, in particular in private one-family dwellings.

In mobile applications such as trains or cars, too, in which air conditioning plants are used for cooling and dehumidification, the use of electric energy from on-board net-works plays an increasingly important role; in the case of electric cars, the operation of the air conditioning plant is in direct competition with the range of the vehicle.

A more efficient process would be hybrid air conditioning, with the drying step and the cooling step being carried out separately. For drying of the air, there are absorptive processes in which the hygroscopic nature of, for example, lithium bromide solutions is exploited in order to bind atmospheric humidity; recycling occurs via an evaporation step. Owing to the aggressive nature of the best solutions, namely lithium bromide and chloride, the use of special, noncorroding materials is necessary for industrial implementation, but these make the system expensive and complicated to maintain. As an alternative, it is possible to use adsorption systems in which atmospheric humidity is bound in a usually solid material such as zeolites or silica gel—in the field of research (e.g. Y. D. Tu et al, Nature 7, 40437; DOI 10.1038/Srep40437) formulations composed of lithium salts in nanoporous silica have also been described; recycling is effective by heating of the adsorbents. The reaction of water on the desiccants liberates a large quantity of energy which heats the air and the material and leads to an additional cooling load. At the same time, energy is required to regenerate the adsorbent again, so that the energy consumption of such an air conditioning plant is increased further. An intelligent process procedure using a drying wheel, in the case of which the adsorbent is located as thin layer on a rotating wheel through which air flows and the adsorbent is regenerated by means of hot air during part of the revolution, allows the heating and the additional energy required for regeneration to be reduced, e.g. in the DesiCool plant of Munters. However, the overdrying of the air necessitates rehumidification of the air, which due to evaporative cooling reduces the cooling stream but due to the use of liquid water can bring about concerns in respect of hygiene because of the possible implantation and multiplication of bacteria which are damaging to health. The outlay in terms of apparatus for these air conditioning plants with a number of rotating parts incurs the risk of a large outlay for maintenance.

EP 1 408 286 describes an air conditioning plant consisting of two adsorptive air-air heat exchangers or a rotating adsorptive heat wheel and a compression unit. It is stated that in the adsorption mode, the external air is dehumidified in an adsorptive heat exchanger and subsequently cooled in the compression unit. It is also stated that further exterior air flows through the adsorptive heat exchanger during the adsorption mode and takes up the latent heat and thus limits the heating of the heat exchanger and the interior air to be conditioned. This heated exterior air is heated further in the regeneration mode in the compression unit, goes through the loaded adsorptive heat exchanger and carries the evaporated water vapor to outdoors. When the adsorptive heat exchanger is designed as heat wheel, the adsorption mode and regeneration mode can be designed as countercurrent process. Zeolites, silica gel and anion-exchange resin are disclosed as adsorbent material.

EP 2 385 318 describes an air conditioning plant consisting of an adsorptive air-water heat exchanger and an air heat exchanger which operates without a compressor unit. The problem of condensation water formation is solved by the atmospheric humidity being stored as adsorbate in the adsorptive heat exchanger and being liberated again as atmospheric humidity in a subsequent drying step. The problems of the capacity of the dryer, heat evolution due to enthalpy of adsorption and overdrying of the air are reduced by mixing in of relative humid, warm interior air to the dried air before the total amount of air is cooled by means of a cold water conduit. The cooling in the air heat exchanger is carried out using water at 15° C. To discharge the adsorbate, interior air is heated by means of a heating element in the regeneration mode and passed through the regeneration part of the drying wheel. Zeolites, silica gel, activated carbon or organic polymers having a hydrophilic functional group are disclosed as adsorbent materials. A disadvantage of the process disclosed in EP 2 385 318 is that the exterior air must be mixed with part of the existing interior air during conditioning, as a result of which odorous materials and pathogens may accumulate.

U.S. Pat. No. 6,199,392 describes an air conditioning plant consisting of a rotating adsorptive heat wheel having two flow passages, a plurality of heat exchangers and a compressor unit. It is stated that, in the conditioning direction, the exterior air is dehumidified in the adsorptive heat wheel and subsequently cooled in the compression unit and, in the regeneration direction, exterior air or used interior room air is heated in the compression unit and then partly goes through the one half of the loaded section of the heat wheel and is partially reheated and goes through the other half of the loaded section of the heat wheel. A high degree of regeneration can be achieved with reduced energy consumption by this stepwise regeneration, so that the capacity of the drying wheels can be increased. No adsorbent material is mentioned. A disadvantage is that the heat of adsorption is not utilized in the adsorptive heat wheel. In addition, the dried air is too dry and has to be humidified for use in the room.

In order that the adsorptive heat exchanger does not heat up during adsorption, DE 10 2009 050 050 proposes using a sorption heat exchanger which has a sorption side and a cooling side, so that during adsorption, the heat of adsorption which arises is transferred to a cooling fluid, e.g. a heat transfer medium in the form of an aerosol. A disadvantage is that the heat of adsorption is not utilized.

In a similar sense, Kubota et al. (Appl. Thermal Eng. 122 (2017) 618-625) describe an experimental setup in which humid exterior air can be dried by means of an adsorbate-coated air-air heat exchanger. The examples published in the document show that the air can be dried by means of a heat exchanger coated with adsorbent. However, the publication does not describe a complete setup by means of which a continuous process for drying and cooling the exterior air, including regeneration of the adsorbents is made possible. Furthermore, nothing is said about possible integration of the heat of adsorption into the heat circuit of the apparatus. The long conduit in the feed facility for the exterior air into the coated heat exchanger, as described in the publication, also stands in the way of commercial use which requires a compact configuration.

A further challenge associated with the adsorbent-based air conditioning plants is the high temperature required for efficient regeneration of the adsorbent. In the case of the zeolites which are customarily used, this is from 140 to 200° C. Some publications state that regeneration of the adsorbent is possible at lower temperature, but in this case greater quantities of air and/or previously predried air have to be used (Kubota et al., Appl. Thermal Eng. 122 (2017) 618-625, and Wang et al. Intern. Journal of Thermal Science 126 (2018) 13-22).

In Energy Procedia 78 (2015) 3471-3476, Portia Murray et al. describe a decentralized air conditioning ventilation facility using a rotating drying wheel and a rotating heat transfer wheel. However, drying of the air (latent cooling) takes place exclusively by means of a cooling water conduit in this setup.

A further problem is that the adsorbent properties of the thermodynamic drying equilibrium "water (gaseous) to water bound in the adsorbent" lies strongly on the side of the bound water in the case of the adsorbents mentioned in the prior art, so that overdrying occurs and this then has to be compensated for by addition of water in a further step. This second step is not only complicated in terms of apparatus and energy-intensive, but this step also incurs the risk of possible implantation and multiplication of bacteria which are harmful to health. Furthermore, a large quantity of heat of adsorption is liberated in the adsorbent-based air conditioning plants and this has hitherto been integrated only inefficiently into the heat circuit.

WO 99/36733 discloses porous aluminum phosphates having the general chemical formula $Al_2O_{3k}(P_2O_5)$ where $k=1.0\pm0.2$, known as Sapo zeolites, which can be regenerated at 120-140° C. and thus offer the possibility of an energy-efficient air conditioning plant, as desiccants.

EP 2 230 288 describes the use of porous metal-organic frameworks, known as MOFs, as adsorption material for cold/heat machines. Compared to the zeolites customarily used, these MOFs have higher capacities and lower regeneration temperatures.

Furthermore, the use of porous metal-organic frameworks as adsorption material in a ventilation system is disclosed in the European patent application number 15195166.2.

Owing to the generally great requirement for air conditioning plants and the ever increasing energy requirement for operating these plants, there is great interest in more energy-efficient air conditioning plants which are advantageously simple in terms of apparatus and can also advantageously be constructed compactly.

It is therefore an object of the present invention to achieve thermodynamically advantageous operation of an air conditioning apparatus as a result of, where possible, neither overdrying nor overcooling consuming unnecessary energy. The drying should preferably be achieved isothermally, so that the subsequent cooling requirement is reduced. Furthermore, the heat of adsorption should be integrated into the heat circuit of the apparatus. Furthermore, the energy-intensive regeneration should be realized as effectively as possible. Furthermore, a complete system which combines adsorptive drying, energy-efficient regeneration and also a low outlay for maintenance and the avoidance of liquid water should be provided.

It is a further object of the present invention to provide an air conditioning apparatus which allows an effective mode of operation with a reduced outlay in terms of apparatus and few mechanical elements. Furthermore, simplified control should be able to be realized.

It is a further object of the present invention to provide an air conditioning apparatus in which the air streams, namely process air and interior waste air, can be kept separate from one another, so that 100% introduction of fresh air can be ensured.

A further object of the present invention is to provide an air conditioning apparatus which is compact and low-maintenance.

It is a further object of the present invention to provide an air conditioning apparatus which can operate without compressors.

The object has been able to be achieved by the following process for conditioning a fluid, in particular for drying and/or cooling exterior air, which comprises the following steps:
  (a) flow of the process fluid, advantageously exterior air, through the sorption channels of a first adsorptive heat exchanger, preferably cross-flow heat exchanger,
  (b) drying of the process fluid in the first adsorptive heat exchanger,
  (c) flow of the dried process fluid to the cold side of a cold source,
  (d) cooling of the dried process fluid in a cold source,
  (e) flow of the dried and cooled process fluid into the region to be conditioned,
  (f) parallel flow of the regeneration fluid, advantageously exhaust air from the region to be conditioned, through the heat exchanger channels of the first adsorptive heat exchanger, (g) uptake of the heat of adsorption by the regeneration fluid,
(h) flow of the heated regeneration fluid to the hot side of a heat source,
(i) further heating of the regeneration fluid in the heat source,
(j) flow of the heated regeneration fluid through the sorption channels of a second absorptive heat exchanger, advantageously cross-flow heat exchanger,
(k) vaporization of the adsorbates located in the second absorptive heat exchanger and uptake of these adsorbates by the regeneration fluid,
(l) flow of the moist regeneration fluid into an exterior region.

The sorption channels comprise adsorption material. The heat exchanger channels advantageously comprise less than 5% of adsorption material, based on the loading of the sorption channels with adsorption material. The heat exchanger channels advantageously have no adsorption material.

The adsorption material advantageously has a thickness of from 0.2 to 2 $g/cm^3$, preferably from 0.3 to 1.5 $g/cm^3$, in particular from 0.3 to 1 $g/cm^3$.

The flow velocity is advantageously determined as a function of the total flow cross section of the heat exchanger. Typical flow velocities are from 30 to 150 $m^3/h$, advantageously from 50 to 100 $m^3/h$, for decentralized, small air conditioning plants. Typical flow velocities are from 1000 to 30 000 $m^3/h$, advantageously from 1500 to 20 000 $m^3/h$, for centralized, large air conditioning plants.

The process fluid is advantageously filtered and freed of particles and/or droplets before flowing through the heat exchanger.

The process fluid is advantageously conveyed via an apparatus for acoustic damping so as to minimize exterior noises before flowing through the heat exchanger.

As heat sources or cold sources, it is possible to use heat pumps based on compressor plants, thermally or electrically driven, preferably solar-thermally driven absorption or adsorption plants or water conduits, optionally with heating devices, advantageously water conduits and adsorption heat pumps or combinations thereof. The heating devices can advantageously be operated electrically or solar-thermally. Suitable heating and cooling devices also include purely electrically operated components such as Peltier elements, magnetocaloric elements, electric wire and area heatings. For the purposes of the present invention, the "cold side of the heat-cold source" is the cold pole, in the case of compressor plants the vaporizer side. The "hot side of the heat-cold source" is the hot pole, in the case of compressor plants the condenser side.

The conditioning of a fluid, preferably exterior air, requires at least two sorption heat exchangers in order to achieve effectively continuous operation. The adsorption, i.e. dehumidification, takes place in one of the two sorption heat exchangers, while the other sorption heat exchanger is regenerated in parallel. In each case at least one sorption heat exchanger is accordingly in the adsorption phase and at least one sorption heat exchanger is in the regeneration phase.

Since the sorption heat exchangers can take up only a particular amount of moisture and the speed of adsorption decreases with increasing loading, the adsorption and regeneration phases advantageously change cyclically. Effectively continuous operation can be ensured in this way.

The desired conditioning can be set and thus adapted to the prevailing climate by adjusting the cycle time, taking into account the selected sorption material and the size of the adsorptive heat exchanger areas. The desired conditioning is different in different climatic regions, i.e. in regions close to the coast dehumidification predominates, while cooling predominates in inland regions. The cycle time is typically from 5 minutes to 1 hour. Sensors which can measure the temperature and/or atmospheric humidity are advantageously used in order to optimize the switching time to the prevailing weather. These sensors are advantageously installed in the conduits.

Before the adsorption phase, the regenerated absorptive heat exchanger can optionally be cooled. This cooling can be effected by flow of a regeneration fluid, advantageously exhaust air from the region to be conditioned, through the heat exchanger or by flow of dried and cooled process fluid, i.e. the conditioned air, through the heat exchanger. Furthermore, this cooling could also be carried out by flow of exterior air through the heat exchanger. Advantageously, flow occurs exclusively through the heat exchanger channels of the heat exchanger to be cooled. This cooling phase advantageously takes from 1 minute to 5 minutes. This cooling phase advantageously takes up from about 1 to 20% of a cycle. In the cooling phase, the regenerated absorptive heat exchanger is advantageously cooled from a temperature of 80-100° C. to a temperature of 25-35° C.

The flow of the process fluid through the sorption channels of a first absorptive heat exchanger and the flow of the regeneration fluid through the heat exchanger channels of the first absorptive heat exchanger is advantageously interrupted before the cooling phase of the second heat exchanger.

After the optional cooling phase, the following steps take place:
(m) optionally interruption of the flow of the process fluid and of the regeneration fluid in the first adsorptive heat exchanger, should this not yet have taken place,
(n) flow of the process fluid through the sorption channels of a second absorptive heat exchanger,
(o) drying of the process fluid in the second absorptive heat exchanger,
(p) flow of the dried process fluid to the cold side of a cold source,
(q) cooling of the dried process fluid in a cold source,
(r) flowing of the dried and cooled process fluid into the region to be conditioned,
(s) parallel flow of the regeneration fluid through the heat exchanger channels of the second absorptive heat exchanger,
(t) uptake of the heat of adsorption by the regeneration fluid,
(u) flow of the heated regeneration fluid to the hot side of a heat source,
(v) further heating of the regeneration fluid in the heat source,
(w) flow of the heated regeneration fluid through the sorption channels of a first absorptive heat exchanger,
(x) vaporization of the adsorbates located in the first absorptive heat exchanger and uptake of these adsorbates by the regeneration fluid,
(y) flow of the moist regeneration fluid into an exterior region.

After these steps (m) to (y), the flow of the process fluid and of the regeneration fluid is preferably interrupted again. Furthermore, the first absorptive heat exchanger is optionally cooled before the steps (a) to (l) are gone through again.

The process fluid, in particular exterior air, advantageously has a temperature of from 10 to 50° C., preferably from 25 to 35° C., and a relative atmospheric humidity of from 40 to 100%. After the adsorption in the absorptive heat exchanger, the process fluid advantageously has a temperature of from 20 to 45° C., preferably from 25 to 40° C., and a relative atmospheric humidity of from 25 to 35%, preferably from 28 to 33%. After the conditioning by means of the cold side of the heat-cold source, the process fluid advantageously has a temperature of from 18 to 25° C., preferably from 22 to 24° C., and a relative atmospheric humidity of from 40 to 55%, preferably from 45 to 55%.

The regeneration fluid, advantageously exhaust air from the region to be conditioned, advantageously has a temperature of from 25 to 30° C. and a relative atmospheric humidity of from 50 to 80%, preferably from 60 to 75%. After the heat transfer in the absorptive heat exchanger, the regeneration fluid advantageously has a temperature of from 25 to 45° C., preferably from 25 to 40° C., and a relative atmospheric humidity of from 30 to 70%, preferably from 35 to 60%. After the conditioning by means of the hot side of the heat-cold source, the regeneration fluid advantageously has a temperature of from 60 to 100° C., preferably from 70 to 95° C., and a relative atmospheric humidity of from 1 to 10%, preferably from 3 to 7%. After regeneration of the second absorptive heat exchanger, the regeneration fluid advantageously has a temperature of from 30 to 50° C., preferably from 33 to 45° C., and a relative atmospheric humidity of from 70 to 95%, preferably from 80 to 95%.

Interior air can optionally be mixed into the dried and cooled process fluid, i.e. the conditioned process fluid, before the latter flows into the region to be conditioned. In the case of such mixing-in, the ratio of dried and cooled process fluid to interior air is advantageously from 1 to 60, preferably from 10 to 40.

However, it is advantageous to introduce 100% of dried and cooled process fluid into the region to be conditioned.

The dried and cooled process fluid optionally passes through an adsorption apparatus before being introduced into the region to be conditioned. Fluctuations in the relative atmospheric humidity can be evened out by means of this adsorption apparatus.

Figure 1:
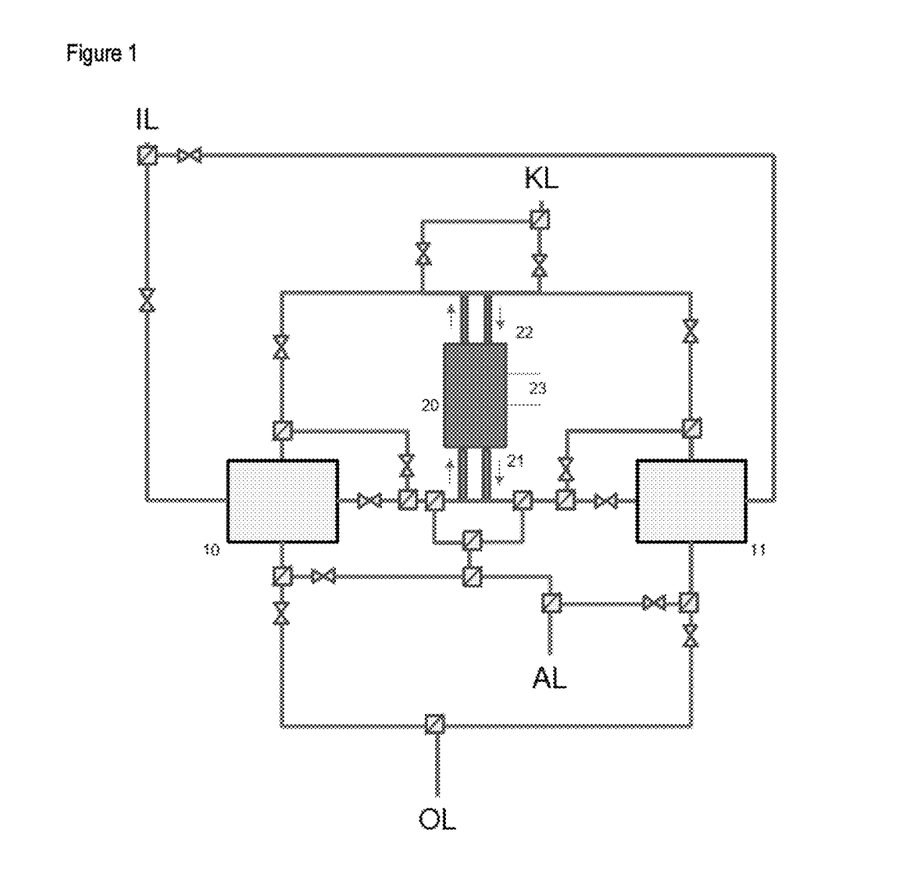

A possible routing of the various fluid streams is shown in FIG. 1.

Apparatuses according to the invention comprise no movable, in particular rotating, parts except for electrically actuatable valves or air flaps. The absorptive heat exchanger, preferably cross-flow heat exchanger, in which drying of the air takes place and the heat-cold source in which the heating/cooling of the feed air and the regeneration air take place are connected to one another exclusively via connecting pieces, e.g. rigid pipes or movable hoses.

The apparatuses of the invention are advantageously particularly compact pieces of equipment. For the purposes of the present invention, "compact" refers to a particularly small construction having a length dimension of from 300 cm to 60 cm, preferably from 200 cm to 80 cm, preferably from 120 cm to 100 cm, a second length dimension of from 200 cm to 50 cm, preferably from 120 cm to 60 cm, preferably from 100 cm to 70 cm, and a third dimension of from 100 cm to 25 cm, preferably from 50 cm to 25 cm, preferably from 35 cm to 25 cm.

When narrow pipes, i.e. the cross section through which flow occurs is at least 30% smaller than the flow cross section of the heat exchanger, are used, it is advantageous to optimize the flow behavior of the air through the heat exchanger so that flow occurs under similar pressure through all channels. For this purpose, elements which fan out and/or laminize the air flow are advantageously inserted directly, i.e. advantageously at a distance of from 1 to 10 cm, before the heat exchangers. Examples which may be mentioned are filters, meshes and/or grids which can optionally be used in conjunction with conical connecting pieces, or multiway systems which are equipped with valves and/or air flaps and can systematically actuate different channel systems of a heat exchanger during a cycle. The long feed conduits described in the literature, which laminize the air flow and prepare it for passage through the heat exchangers, can in this way be dispensed with.

The invention is also applicable to other sorbates apart from water.

Preferred adsorbents display a high selectivity for adsorbing polar vapor molecules from gases. The ability to adsorb water vapor from humid air is possessed by the following materials: modified carbon (activated carbon), silica gels, activated aluminum oxide, activated bauxite, molecular sieves and metal-organic frameworks (MOFs), lithium salts immobilized in oxides, e.g. silicon oxide.

It is advantageous to use metal-organic frameworks which have water-adsorbing properties and/or modified carbon (activated carbon).

MOFs are superior to the classical adsorbent materials such as silica gels or zeolites in terms of a number of properties: (i) saturation capacity: zeolites require 10 kg of adsorption material per liter of water while MOFs require from 1 to 2 kg of adsorption material per liter of water, (ii) regeneration temperature: zeolites require from 140 to 170° C. while MOFs require from 70 to 80° C., (iii) enthalpy of adsorption: MOFs liberate an average of 20-30% less heat of adsorption.

An important advantage for the present invention is the thermodynamic drying equilibrium "water (gaseous) to water bound in the adsorption medium": In the case of MOFs, this equilibrium is less far from the side of the bound water compared to the zeolites. Thus, overdrying can be avoided when MOFs are used. Furthermore, rehumidification with the abovementioned problems can be completely avoided thereby. Furthermore, overheating can likewise be avoided when using modified carbon (activated carbon). The MOFs from the following group can advantageously be used, individually or as a mixture, as water-adsorbing MOFs: HKUST-1, MOF-804, Basolite A120, BASOLITE® A520, MIL-160, MOF-841, U10-66, DUT-67 and/or MOF-801.

The water-adsorbing MOFs also advantageously have a cycling stability of >100 000, with a cycle consisting of the modes adsorption and regeneration.

The MOFs from the following group can advantageously be used, individually or as a mixture, as water-adsorbing and cycling-stable MOFs: BASOLITE® A520, MIL-160, MOF-841, U10-66, DUT-67 and/or MOF-801.

Aluminum-fumarate MOF, which is commercially available as BASOLITE® A520, and MIL160 are particularly suitable as adsorption material.

MOFs can easily be produced from inexpensive reagents and have a satisfactory stability to water. MOFs are known in the prior art and are described, for example, in U.S. Pat. No. 5,648,508, EP-A-0 790 253, M. O'Keeffe et al., J. Sol. State Chem., 152 (2000), pages 3 to 20, H. Li et al., Nature 402, (1999), page 276, M. Eddaoudi et al., Topics in Catalysis 9, (1999), pages 105 to 111, B. Chen et al., Science 291, (2001), pages 1021 to 1023, DE-A-101 11 230, DE-A 10 2005 053430, WO-A 2007/054581, WO-A 2005/049892 and WO-A 2007/023134.

The adsorption material, in particular the MOFs, can be provided as pulverulent material, granular materials, shaped bodies or monoliths and can, for example, be arranged as matrix, as coating or as packing, e.g. a packed bed or a moving bed, in a housing.

In a preferred embodiment of the present invention, the sorption material is deposited as coating on a substrate, advantageously the walls and/or internals of the sorption channels of the adsorptive heat exchanger. The sorption material can be coated with or without binders. The substrate advantageously consists of metal.

The present invention further provides an air conditioning apparatus for conditioning a fluid, preferably for cooling and/or drying air, comprising
- a first absorptive heat exchanger, preferably cross-flow heat exchanger, which has sorption channels in at least one flow direction and has heat exchanger channels in at least one flow direction,
- a heat-cold source for the removal of heat arranged downstream of the first absorptive heat exchanger in the flow direction of the sorption channels,
- a heat-cold source for the uptake of heat arranged downstream of the first absorptive heat exchanger in the flow direction of the heat exchanger channels and
- a second absorptive heat exchanger, preferably cross-flow heat exchanger which is arranged downstream of the heat/cold source for the uptake of heat and has sorption channels in at least one flow direction and has heat exchanger channels in at least one flow direction, where the sorption channels on the second heat exchanger are arranged in the flow direction of the heat exchanger channels of the first heat exchanger.

MOFs are advantageously used as adsorption material, see description and preferences above.

Filter and purification devices are advantageously installed upstream of the absorptive heat exchangers. Devices for acoustic damping of the process fluid are advantageously installed upstream of the absorptive heat exchangers.

The invention further provides an absorptive air-air cross-flow heat exchanger which has sorption channels comprising water-absorbing metal-organic frameworks in at least one flow direction and heat exchanger channels in at least one other flow direction, where the heat exchanger channels comprise less than 5% of adsorption material based on the loading of the sorption channels with adsorption material.

The heat exchanger channels advantageously have no adsorption material.

The air-air cross-flow heat exchanger is advantageously configured with a plurality of parallel sorption channels and a plurality of parallel heat exchanger channels being present. Here, parallel arrangement means that these flow channels each have a joint inlet and a joint outlet. The sorption channels and the heat exchanger channels of the sorbent heat exchanger are advantageously arranged alternately. Such an alternating arrangement makes optimized heat transfer within the heat exchanger possible. At the same time, mixing of the fluid streams is to be avoided.

The channel width is advantageously from 0.5 to 2 mm, in particular from 0.7 to 1.5 mm. The channel width of the sorption channels and of the heat exchanger channels can be different. The flow resistance of the sorption channels and of the heat exchanger channels is advantageously the same. The sorption channels are therefore advantageously wider than the heat exchanger channels by twice the coating thickness of the adsorption material.

The coating thickness of the adsorption material is advantageously from 10 to 200 µm, preferably from 20 to 150 µm, in particular from 25 to 100 µm.

The air-air cross-flow heat exchanger of the invention is advantageously used for the conditioning of fresh air, advantageously in buildings or vehicles.

The process for conditioning fluids and the corresponding air conditioning apparatus are advantageously used for conditioning of air for the air conditioning of buildings or of vehicles, in particular trains and electric cars. This process and this apparatus are particularly advantageously used for the air conditioning of hospitals, laboratories and other facilities in which a 100 percent introduction of fresh air is prescribed.

Furthermore, the present invention provides an outer wall element comprising a built-in air conditioning apparatus according to the present invention. The compactness of the air conditioning apparatus of the invention allows installation in an outer wall element and thus makes decentralized, flexible air conditioning possible. Furthermore, this decentralization allows individual, effectively personalized control of the air conditioning, e.g. the temperature selection per outer wall element. This individual control could, for example, be carried out via the use of apps.

The advantage of the present invention lies in the synergy between the following features: (i) use of an effective adsorption material, in particular an adsorption material having a high loading capacity and low recycling temperatures, (ii) use of a regeneration fluid which has a very large temperature difference and moisture content difference from the selected (regenerated) adsorption material and (iii) the utilization of the heat of adsorption for regeneration.

The problem of overdrying and the associated rehumidification has been able to be avoided by means of the present invention. No condensed water is formed at any point. Furthermore, the two fluid streams, namely exterior air and interior exhaust air, can be kept separate through the entire air conditioning apparatus. The present air conditioning apparatus is low-maintenance due to the avoidance of a compressor unit. Due to the use of an adsorption material having a high capacity, it is possible to build compact air conditioning apparatuses which are advantageously integrated in decentralized form into a building. The compact air conditioning apparatus makes it possible to integrate this unit into an outer wall element and control it in a decentralized manner. Furthermore, regeneration has been able to be simplified by the use of an adsorption material having a high capacity and a low regeneration temperature. The regeneration according to the present invention can be changed over from exterior air to interior exhaust air because of the reduced regeneration requirement. This use of the interior exhaust air as regeneration fluid offers the opportunity of simplified control since fluctuations in the temperature and humidity of the interior exhaust air remain in a narrow range, unlike the case of the exterior exhaust air.

FIG. 1: Abstracted structure of the air conditioning apparatus

The following abbreviations are used in FIG. 1:

OL Exterior air

KL Conditioned air

IL Interior air

AL Exhaust air

10 Absorber heat exchanger 1

11 Absorber heat exchanger 2

20 Heat pump

Figure 2:
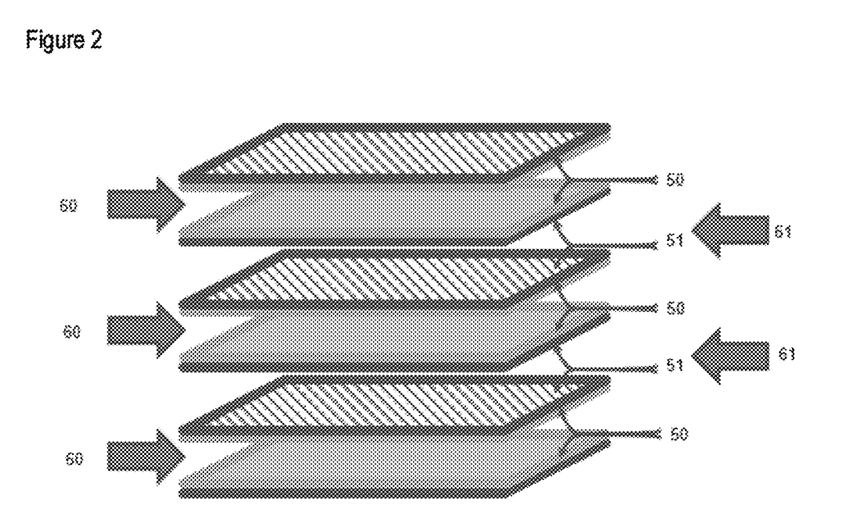
Figure 3:
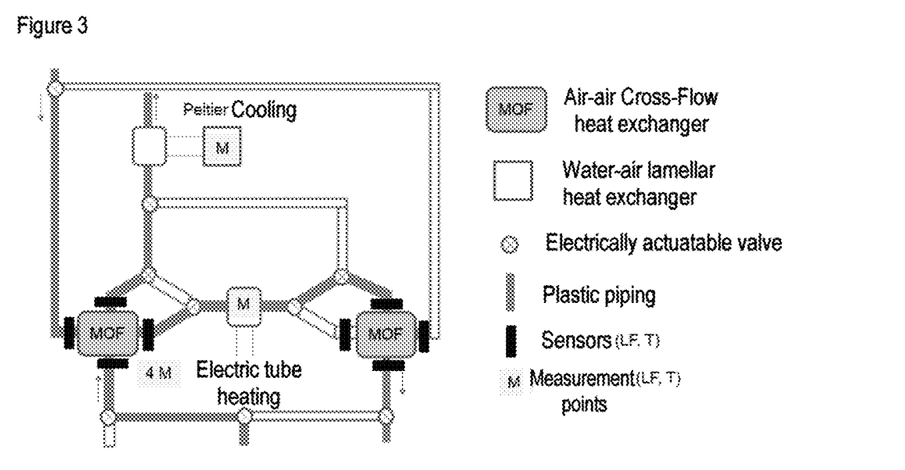

21 Hot pole of the heat pump
22 Cold pole of the heat pump
23 Drive energy for the heat pump FIG. 2: Structure of the air-air cross-flow heat exchanger
The following abbreviations are used in FIG. 2:
50 Heat exchanger area coated with absorbent
51 Uncoated heat exchanger area
60 Flow of the fluid, advantageously air, to be dried or regenerated
61 Flow of the regeneration fluid, advantageously exhaust air, to be cooled FIG. 3: First routing state of the air conditioning apparatus of the invention In the lower part of FIG. 3, the optionally filtered exterior air flows into the apparatus and is conveyed via the left-hand branch into the sorption channels of the first heat exchanger which has been coated according to the invention. The dried air leaves the heat exchanger upward in the direction of a cooling element, here denoted by way of example by Peltier cooling. At top left of the figure, air flows from the interior space into the heat exchanger channels of the first, active heat exchanger and, heated by the heat of adsorption, leaves the latter at right in the direction of the supplementary heating device, here configured by way of example as electric tube heating. The heated air flows from above into the sorption channels of the second heat exchanger to be regenerated and leaves the apparatus with water vapor from the regeneration process.

Figure 4:
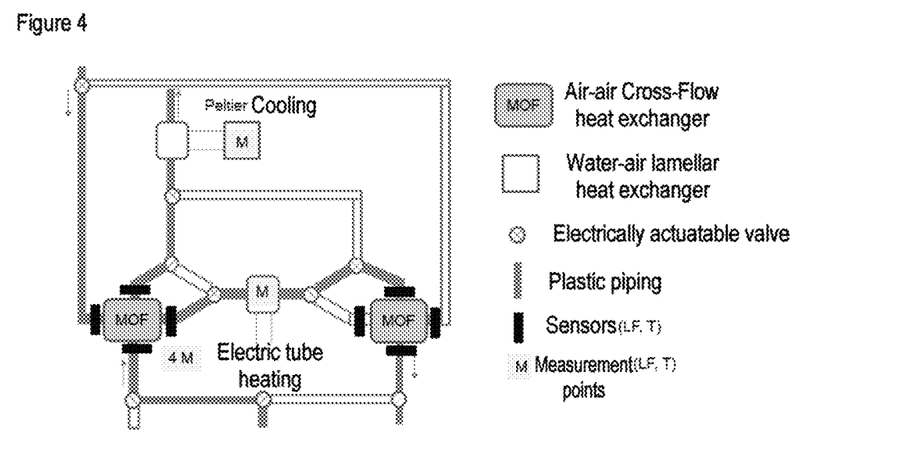

FIG. 4: Second routing state of the air conditioning apparatus of the invention. In the lower part of FIG. 4, the optionally filtered exterior air flows into the apparatus and is conveyed via the right-hand branch into the sorption channels of the previously regenerated heat exchanger which has been coated according to the invention. The dried air leaves the heat exchanger upward in the direction of a cooling element, here denoted by way of example by Peltier cooling. At top left in the figure, air flows from the interior space into the heat exchanger channels of the active heat exchanger and, heated by the heat of adsorption, leaves the latter at left in the direction of the supplementary heating device, here configured by way of example as electric tube heating. The heated air flows from above into the sorption channels of the second heat exchanger to be regenerated and leaves the apparatus with water vapor from the regeneration process.

EXAMPLE 1

Aluminum fumarate was prepared as described in EP2 230 288.

A dispersion composed of 1300 g of aluminum fumarate and 3300 g of distilled water was produced by stirring at 570 rpm by means of a toothed disk stirrer (7 cm disk diameter; Heidolph RZR2010control) for 15 minutes. After addition of 810 g of polyacrylate dispersion (Acronal® Edge, 40% solids content), the stirrer speed was increased to 740 rpm for 15 minutes. Five batches produced in this way were mixed using a propeller stirrer (diameter 10 cm, IKA EURO ST 40DS0000) and homogenized for 12 hours. The foam was subsequently removed and the dispersion was degassed by slow stirring.

The dispersion had a viscosity of 4 Pa s at 10 Hz (measured using Anton Paar, MCR102, PP50, 400 μm gap, 25° C.).

The dispersion was introduced twice through one of the two channel systems of a countercurrent heat exchanger made of aluminum (length 397 mm; height 172 mm; width 200 mm; channel width uncoated about 1 mm; Klingenburg GS18-200) and the channels were blown free by means of air. After drying of the heat exchanger, a total weight increase of 346 g, corresponding to an average layer thickness of 96 μm, was obtained.

Example 2

A heat exchanger which had been coated as in example 1 was connected so that air at 27° C. with 90% relative atmospheric humidity (OL) was passed through the coated channel bundle (1) and air at 20° C. with 80% relative atmospheric humidity (IL) was passed through the other channel bundle. The flow rate was 50 m$^3$/h. Within the first 5 minutes of operation of the adsorber, temperatures in the range from 28° C. to 32° C. and a relative atmospheric humidity in the range from 35% to 50% were established at the outflow end of the coated channel bundle (KL). The enthalpy of the air was for this purpose reduced isothermally from 80 kJ/kg to 63 kJ/kg.

The outflow from the uncoated channel bundle (AL) displayed a temperature increase to 30° C. The enthalpy of this air stream rose from about 51 kJ/m$^3$ to about 63 kJ/m$^3$. The heat exchanger heated up by 10°. Within the first 5 minutes, 60 kJ/m$^3$ were transferred from the exterior air stream (OL→KL) to the interior air stream (IL→AL), which corresponds to about 50% of the adsorption enthalpy of water on aluminum fumarate.

Example 3

The heat exchanger of example 2 was flushed for 5 minutes with hot, dry air (90° C., 3% rel. atmospheric humidity). The experiment of example 2 was then repeated. Temperatures in the range from 27° C. to 33° C. and a relative atmospheric humidity in the range from 40 to 50% were measured at the outflow end of the coated channel bundle within the first 5 minutes.

Example 4

Comparison with Kubota et al.

|  | According to the invention | Kubota et al |
|---|---|---|
| Heat exchanger | Air-air plate heat exchanger, about 20 cm × 20 cm × 40 cm, without internal fins, internal surface area about 1 m$^2$ | Air-air plate heat exchanger, about 20 cm × 20 cm × 20 cm, with internal fins; internal surface area about 12 m$^2$ |
| Coating | Aluminum fumarate, about 150 g/m$^2$ | Aluminophosphate, about 30 g/m$^2$ |
| Total amount of absorbent | 150 g | 360 g |
| Flow rate | 60 m$^3$/h | 1 m/s, 72 m$^3$/h |
| Adsorption time to half maximum, measure of the cycle time | 300 s | 300 s |

Adsorption Time to Half Maximum:

When exterior air (ODA) flows through a freshly regenerated heat exchanger, it is dried very quickly. The enthalpy of adsorption involved here produces a temperature increase. The increasing loading of the absorbent with water leads to a reduction in the uptake of moisture and the enthalpy of adsorption. The exiting air (SUP) therefore approaches the exterior air in respect of atmospheric humidity and temperature with increasing time. The operation then has to be switched over to the other cycle. The time from the commencement of the adsorption to the point in time when the temperature or atmospheric humidity has become equal to half the maximum of the exterior air conditions is selected as a characteristic measure of the cycle time of a setup having two alternately operated coated heat exchangers. Under these conditions, it can be assumed that the quickly available amount of adsorbent is loaded and the distribution of the enthalpy of adsorption is largely concluded.

Figure 5:
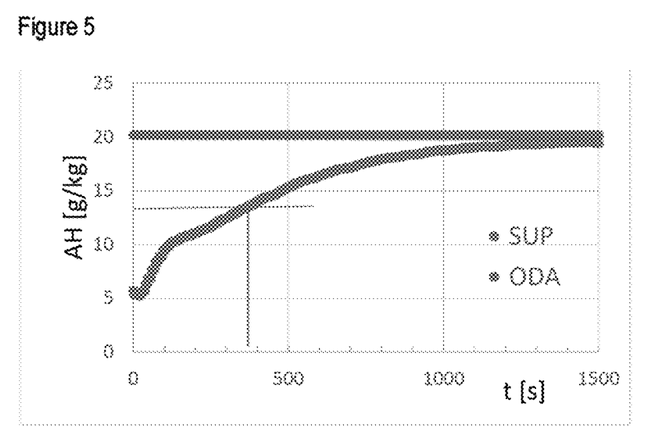

Explanation for Evaluation of the Measured Curves: FIG. 5

Evaluation of the measured curve for 60 m$^3$/h. The atmospheric humidity of the exterior air (ODA) is 20 g/kg, and that of the feed air (SUP) varies with the saturation of the adsorbent. In the case of a regenerated adsorbent, the atmospheric humidity is 5 g/kg, and after long times it approximates the exterior air. The curve can be characterized by means of the time to half maximum, here indicated by the lines at 13 g/kg and about 350 s.

Figure 6:
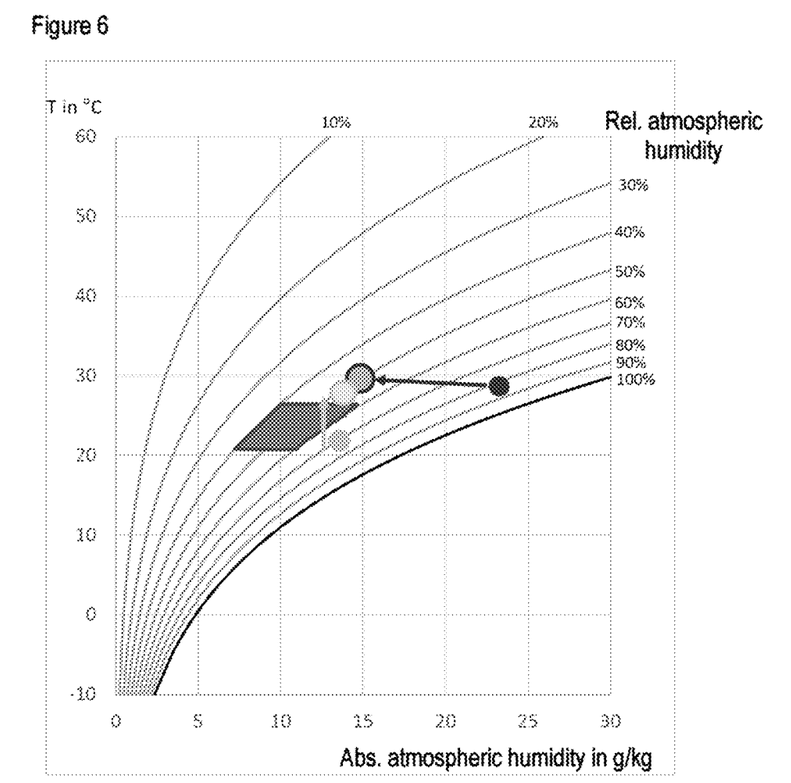

FIG. 6: Adsorption and desorption curve of aluminum-fumarate MOF. The graph shows the equilibrium state of the loading of MOF with water as a function of the relative atmospheric humidity. In contrast to typical analogous measurements on zeolites, the MOFs display a two-part curve: below 20% relative atmospheric humidity, the MOF does not take up any water vapor, i.e. it does not overdry the air. In the range from 20 to 40% relative atmospheric humidity, the MOF absorbs up to 30% of its own weight of moisture from the air. At even higher relative atmospheric humidities, a further continuous uptake of water occurs.

Figure 7:
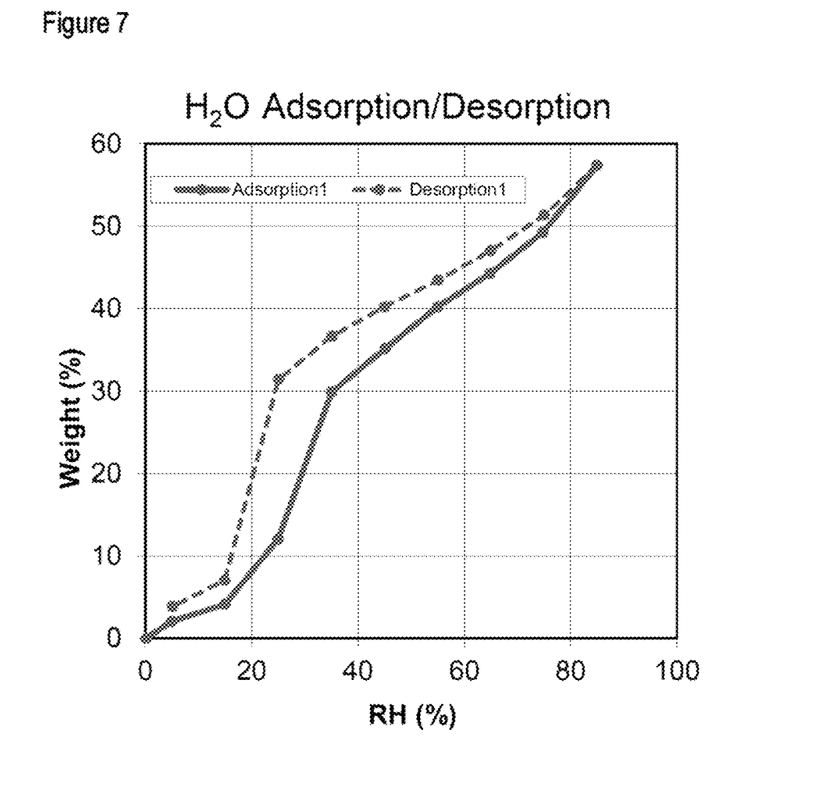

Explanation for the Mollier Diagram, FIG. 7:

The graph shows the possible combinations of absolute atmospheric humidity and temperature. In this depiction, the influence of the atmospheric humidity on the density of the air has been disregarded (this effect would allow the isotherms (states having the same temperature) to increase slightly from the left to the right.)

The uptake capacity of air for water vapor increases with increasing temperature. The saturation curve is indicated as 100% relative atmospheric humidity. Below this temperature, atmospheric moisture condenses as mist. For this reason, it is also referred to as "mist curve".

The comfort range for office rooms is from 40% relative atmospheric humidity/20° C. to 60% relative atmospheric humidity/26° C.

A typical example of exterior conditions in a hot humid climate is the point with 30° C. and 80% relative atmospheric humidity (about 23 g/kg of water vapor). To get into the range of interior room comfort, the air must, in particular, be dried. In the established air conditioning technology, this is achieved by cooling to about 10° C., so that the moisture in the air condenses out until the absolute atmospheric humidity is about 10-12 g/kg (mist curve).

The air can be dried virtually isothermally by means of the coated heat exchanger of the invention, without being cooled.

Drying without heat exchanger would lead to an increase in the temperature of the air as a result of liberation of the enthalpy of condensation and of adsorption of the water.

The invention claimed is:

1. An absorptive air-air cross-flow heat exchanger, wherein the channels of the heat exchanger have no internal fins, wherein the heat exchanger has sorption channels having a channel width of from 0.5 to 2 mm, the sorption channels coated with an adsorption material in at least one flow direction, the adsorption material comprising water-adsorbing metal-organic frameworks, wherein a coating thickness of the adsorption material in the sorption channels is from 10 to 200 µm, and heat exchanger channels in at least one other flow direction, wherein an amount of an adsorption material coated in the heat exchanger channels is less than 5% of an amount of the adsorption material coated in the sorption channels.

2. The absorptive air-air cross-flow heat exchanger according to claim 1, wherein the heat exchanger channels have no adsorption material.

3. The absorptive air-air cross-flow heat exchanger according to claim 1, wherein the channel width of the sorption channels is from 0.7 to 1.5 mm.

4. The absorptive air-air cross-flow heat exchanger according to claim 1, wherein the coating thickness of the adsorption material in the sorption channels is from 20 to 150 µm.

5. A process for conditioning a fluid, which comprises the following steps:
(a) flow of the process fluid through the sorption channels of a first absorptive heat exchanger,
(b) drying of the process fluid in the first absorptive heat exchanger,
(c) flow of the dried process fluid to the cold side of a cold source,
(d) cooling of the dried process fluid in a cold source,
(e) flow of the dried and cooled process fluid into the region to be conditioned,
(f) parallel flow of the regeneration fluid through the heat exchanger channels of the first absorptive heat exchanger,
(g) uptake of the heat of adsorption by the regeneration fluid,
(h) flow of the heated regeneration fluid to the hot side of a heat source,
(i) further heating of the regeneration fluid in the heat source,
(j) flow of the heated regeneration fluid through the sorption channels of a second absorptive heat exchanger,
(k) vaporization of the adsorbates located in the second absorptive heat exchanger and uptake of these adsorbates by the regeneration fluid,
(l) flow of the moist regeneration fluid into an exterior region;
wherein at least one of the first absorptive heat exchanger and the second absorptive heat exchanger is the absorptive air-air cross-flow heat exchanger of claim 1.

6. The process according to claim 5, wherein exhaust air from the region to be conditioned is used as regeneration fluid.

7. The process according to claim 5, wherein the process is operated cyclically.

8. The process according to claim 5, wherein the steps (a) to (l) and the cooling of the second absorptive heat exchanger are followed by the following steps:
(m) optional interruption of the flow of the process fluid and of the regeneration fluid in the first adsorptive heat exchanger, should this not yet have taken place,
(n) flow of the process fluid through the sorption channels of a second absorptive heat exchanger,
(o) drying of the process fluid in the second absorptive heat exchanger,
(p) flow of the dried process fluid to the cold side of a cold source,
(q) cooling of the dried process fluid in a cold source,
(r) flowing of the dried and cooled process fluid into the region to be conditioned, (s) parallel flow of the regeneration fluid through the heat exchanger channels of the second absorptive heat exchanger, (t) uptake of the heat of adsorption by the regeneration fluid, (u) flow of the heated regeneration fluid to the hot side of a heat source, (v) further heating of the regeneration fluid in the heat source, (w) flow of the heated regeneration fluid through the sorption channels of a first absorptive heat exchanger, (x) vaporization of the adsorbates located in the first absorptive heat exchanger and uptake of these adsorbates by the regeneration fluid, (y) flow of the moist regeneration fluid into an exterior region.

9. The process according to claim 5, wherein, as heat source or cold source, heat pumps based on compressor plants are used.

10. The process according to claim 5, subsequently comprising a further step:

cooling of the second absorptive heat exchanger.

11. The process according to claim 10, wherein the cooling of the second absorptive heat exchanger is achieved by means of the regeneration fluid for the second heat exchanger, the conditioned process fluid and/or the exterior air flowing through the heat exchanger.

12. An air conditioning apparatus for conditioning a fluid, comprising a first absorptive heat exchanger, which has sorption channels in at least one flow direction and has heat exchanger channels in at least one flow direction, a heat-cold source for the removal of heat arranged downstream of the first absorptive heat exchanger in the flow direction of the sorption channels, a heat-cold source for the uptake of heat arranged downstream of the first absorptive heat exchanger in the flow direction of the heat exchanger channels and a second absorptive heat exchanger, which is arranged downstream of the heat-cold source for the uptake of heat and has sorption channels in at least one flow direction and has heat exchanger channels in at least one flow direction, where the sorption channels on the second heat exchanger are arranged in the flow direction of the heat exchanger channels of the first heat exchanger;

wherein at least one of the first absorptive heat exchanger and the second absorptive heat exchanger is the absorptive air-air cross-flow heat exchanger of claim 1.

13. The air conditioning apparatus according to claim 12, wherein the heat exchangers and the heat-cold sources are connected via rigid pipes and/or movable hoses.

14. The air conditioning apparatus according to claim 12, wherein the apparatus does not comprise any rotating components.

15. The air conditioning apparatus according to claim 12, wherein elements which fan out and/or laminarize the airflow are inserted upstream of the heat exchangers.

16. The air conditioning apparatus according to claim 12, wherein the adsorption material has a density of from 0.2 to 2 $g/cm^3$ and metal-organic frameworks and/or modified carbon are used as adsorption material in the sorption channels.

17. The air conditioning apparatus according to claim 12, wherein BASOLITE® A520, MIL-160, MOF-841, U10-66, DUT-67 and/or MOF-801 are used as adsorption material in the sorption channels.

18. An outer wall element comprising an air conditioning apparatus according to claim 12.

* * * * *